United States Patent [19]

Gruber

[11] Patent Number: 4,578,284

[45] Date of Patent: Mar. 25, 1986

[54] POLYAMIDE SHEATHED OPTICAL WAVEGUIDE FIBERS

[75] Inventor: Werner Gruber, Korschenbroich, Fed. Rep. of Germany

[73] Assignee: Henkel Kommanditgesellschaft auf Aktien, Duesseldorf, Fed. Rep. of Germany

[21] Appl. No.: 761,642

[22] Filed: Aug. 1, 1985

[30] Foreign Application Priority Data

Aug. 16, 1984 [DE] Fed. Rep. of Germany ....... 3430008

[51] Int. Cl.[4] .......................... B05D 5/06; C03C 25/02
[52] U.S. Cl. ...................................... 427/163; 65/3.11
[58] Field of Search .......................... 427/163; 65/3.11

[56] References Cited

U.S. PATENT DOCUMENTS 4,062,820 12/1977 Mitchell, III et al. ............ 260/18 N
4,062,828 12/1977 Herwig ........................... 260/45.7 P
4,351,657 9/1982 Kimura et al. ................... 427/163 X

OTHER PUBLICATIONS

English translation of German 31 11 226 (equivalent to U.S. Ser. No. 678,230).

*Primary Examiner*—James R. Hoffman
*Attorney, Agent, or Firm*—Ernest G. Szoke; Henry E. Millson, Jr.; Mark A. Greenfield

[57] ABSTRACT

A method for manufacturing sheathed high tensile strength optical waveguides having drawn glass fiber optical cores in which the cores are passed through a molten thermoplastic polyamide to form an adhering coating which is then cooled to form a uniform sheath. The sheath is flexible over a temperature range of $-40°$ C. to $+80°$ C. and the polyamide contains dimeric fatty acid as one of its monomer components and has a glass transition temperature below $-10°$ C.

17 Claims, No Drawings

POLYAMIDE SHEATHED OPTICAL WAVEGUIDE FIBERS

BACKGROUND OF THE INVENTION

1. Field of the Invention

This invention relates to a method for manufacturing a high tensile strength optical waveguide fiber in which a primary layer of a thermoplastic polyamide is applied to optical fibers after they are drawn, and while the polyamide is molten.

2. Statement of the Related Art

Optical waveguides consist essentially of glass fibers which have a refractive index profile such that incident light is guided in them around curves. Accordingly, they may be used as a light and/or signal transmission medium. The successful use of glass optical waveguides requires maintaining the high tensile strength of the glass fibers and avoiding increases in attenuation. To maintain the high tensile strength of the glass fibers, the optical fibers are sheathed immediately after drawing in at least one protective layer of plastic. The optimal layer thickness of the plastic film layer is determined by its critical mechanical properties, such as E-modulus and hardness, and is generally in the range from 10 to 100 microns ($\mu$).

To avoid attenuation losses, the glass fibers have to be surrounded by a flexible material which does not show any phase transitions, particularly over the required in-use temperature range of $-40°$ C. to $+80°$ C. Thus, the glass transition temperature of the material must be $<-40°$ C. while the change in modulus over the above-mentioned temperature range should amount to less than 2 powers of ten. Neither should there be any change in length at temperatures in the range from $-40°$ to $+80°$ C. This type of layer is called a primary coating. If required, another protective layer (i.e. a secondary coating) may be applied to the primary coating.

In the coating of optical fibers by lacquering, the bare fiber passes immediately after drawing through one or generally several coating units each followed by a drying zone. The coating units may be charged with non-reactive coating materials, i.e. polymers soluble in organic solvents, such as cellulose acetate, polyvinylidene fluoride or polyester imide. Hitherto, the use of commercial polyamides containing dimerized fatty acid has been curtailed by their inadequate low-temperature flexibility, because their glass transition temperatures are higher than $-10°$ C.

One of the disadvantages of the above-mentioned lacquering technique is that, in general, only very thin layers (approx. $5\mu$) can be uniformly applied in each coating cycle. Although a layer thickness of approx. $30\mu$ per coating cycle can be achieved where thermally crosslinkable polysiloxanes are used, the protective film formed in this way is soft and critically lacking in mechanical strength.

In addition to the thermosetting films applied by lacquering, coating materials based on acrylates of epoxide, polyurethane and silicon prepolymers which can be crosslinked by shortwave light have recently been introduced. Although film thickness of from 20 to $50\mu$ per coating cycle can be achieved with systems of this type, the aging behavior of these coating materials and their effect on the static fatigue of the optical fibers have not yet been resolved. The problems presented by the residual monomer content also have not been satisfactorily solved.

DESCRIPTION OF THE INVENTION

Other than in the operating examples, or where otherwise indicated, all numbers expressing quantities of ingredients, reaction conditions, or defining ingredient parameters used herein are to be understood as modified in all instances by the term "about".

This invention affords a manufacturing method which does not have the disadvantages of lacquering and which enables a high tensile strength optical waveguide to be produced in one pass while still providing adequate mechanical protection of the waveguide core. Advantages of this invention are that the polyamides utilized: show high chemical stability with respect to the surface of the glass core and to any corrosive environments; have no adverse effect on the optical properties of the waveguide; critically permit utilization of the waveguide at temperatures of $-40°$ C. up to $+80°$ C.; and avoid the problems arising from residual monomers or encapsulated low molecular weight volatiles emanating from polycondensation found in many other thermoplastic polymers. Furthermore, the method of this invention critically permits protective layers to be applied to the optical fibers uniformly and at high speeds, and with almost immediate non-tacky solidification.

This invention more specifically affords a method for manufacturing a high tensile strength optical waveguide in which, after the glass core fibers are drawn, they are passed through a melt of certain thermoplastic polyamides as described below, which melt is at a temperature of 170° to 260° C., preferably 200° to 215° C. The fibers with a molten polyamide layer are then immediately and very quickly cooled, preferably by gentle application of a drying gas which is at a temperature of 20° to 30° C. The preferred gas is ambient air, although any inert gas such as nitrogen or argon is suitable. The quick cooling is important to ensure a uniform coating and to prevent the coated fibers from sticking to objects in an undesirable manner. Coating in this manner using the particular polyamides described below is previously unknown.

Polyamides useful in this invention must have a glass transition point below $-10°$ C., preferably below $-40°$ C. and must retain flexibility over the temperature range of $-40°$ C. to $+80°$ C. showing a change in tension modulus over this temperature range of less than 2 powers of ten while maintaining a stable length. Particularly suitable polyamides have a torsion modulus of $10^9 N/m^2$ at $-40°$ C. and of $10^8 N/m^2$ at $+50°$ C. The softening point of suitable polyamides should be above 100° C., preferably above 130° C., most preferably above 150° C. and at 210° C. their viscosity should be approximately 1,000 to 10,000 mPa.s.

Polyamides which meet all of the above criteria, and which also display the earlier mentioned advantages, are difficult to find. Particularly useful polyamides are synthesized from a combination of dimeric fatty acid, monomeric fatty or aliphatic acid, polyether diamine, and a lower molecular weight diamine. In all instances more than one species of each component may be used.

More specifically, useful polyamides include the condensation products of:

(a) at least one dimeric fatty acid present in 20 to 60, preferably 35 to 49.5, most preferably 40 to 48 mol %;

(b) at least one C$_{6-22}$ monomeric fatty acid or C$_{6-22}$ aliphatic dicarboxylic acid present in 0.5 to 20, preferably 1 to 15, most preferably 2 to 10 mol %;

(c) at least one polyether diamine of the formula $$H_2N-R_1-O-(RO)_x-R_2-NH_2, \quad (I)$$

wherein x is an integer from 1 to 80, preferably 8 to 80, most preferably 8 to 40, R is a C$_{1-6}$, preferably C$_{2-6}$, aliphatic hydrocarbon which may be branched or linear, R and R$_1$ are each a C$_{2-6}$ aliphatic or cycloaliphatic, preferably aliphatic, hydrocarbon, which may be the same or different, present in 1 to 50, preferably 2 to 35, most preferably 4 to 25 mol percent; and (d) at least one C$_{2-40}$ lower molecular weight diamine present in 15 to 50, preferably 15 to 48, most preferably 25 to 46 mol %.

Dimeric fatty acids that may be used as component (a) are generally polymeric fatty acid mixtures resulting from the polymerization of unsaturated fatty acids, containing at least 50% (by weight) dimers with monomers and trimers to 100%. Mixtures containing at least 70% dimers are preferred, at least 90% dimers is more preferred, and most preferred is a mixture containing 90 to 98% dimers, 1 to 7% monomers, and trimers to 100%. The dimers should be formed from C$_{12-22}$, preferably C$_{14-20}$, most preferably C$_{16-18}$ fatty acid monomers. The monomers are usually unreacted monomer starting material which may be unsaturated and/or branched and the trimers are usually over-reacted starting material. These dimeric fatty acid mixtures are commercially available, and a preferred mixture has 96% dimer, 3% trimer, and 1% monomer, in which the starting (monomeric) fatty acid was a C$_{16-18}$ mixture containing 70% by weight of a C$_{18}$ fatty acid.

Monomeric fatty acids that may be used as component (b) should have 6 to 22, preferably 12 to 22 carbon atoms, examples of which are stearic, oleic, palmitic, a mixture of at least 50% palmitic with the balance to 100% myristic, or any combination of the foregoing acids. Aliphatic dicarboxylic acids that may be used as component (b) should have 6 to 22 carbon atoms and preferably are mixtures having chain length ranges of C$_{6-12}$ or C$_{12-22}$ such as tall oil acids. Useful acids also include adipic, azelaic, sebacic, decanedicarboxylic, and mixtures thereof. Mixtures of the above monomeric fatty acids and aliphatic dicarboxylic acids may also be used.

Polyether diamines of formula I used as component (c) are known compounds, many of which are commercially available. Polyethers with two terminal amino moieties built up from branched or unbranched butane diols, pentane diols and/or hexane diols are useful as well as mixed ethers with two terminal amino moieties. Examples of preferred, commercially available, polyether diamines are: bis-(2-aminopropyl)-polyoxypropylenes and bis-(3-aminopropyl)-polytetrahydrofurans, having molecular weights of 500 to 5,000, especially 700 to 2,500.

Lower molecular weight diamines used as component (d) should have 2 to 40, preferably 2 to 20, most preferably 2 to 6 carbon atoms, and are known compounds. These include aliphatic diamines which may be branched or linear, for example, ethylenediamine, 1,3-diaminopropane 1,4-diaminobutane, neopentyldiamine, hexamethylenediamine, trimethylhexamethylenediamine, and their mixtures. Dimer diamines (i.e. diamines obtained from dimeric fatty acids in which the carboxyl moieties are substituted by amino moieties) are also useful. Useful cycloaliphatic diamines include: diaminodicyclohexylmethane; 3-aminomethyl-3,5,5-trimethylcyclohexylamine; and their mixture. Aromatic diamines such as diaminodiphenylmethane, arylaliphatic diamines such as xylylenediamine, and heterocyclic diamines such as piperazine, dimethylaminopiperazine, and dipiperidylpropane are also suitable. Aliphatic and dimer diamines are preferred.

The above polyamides may be prepared in any known manner by melt condensation. Typically, the acid components react with the amine components at 150° to 250° C., and the water of reaction is removed by distillation, under vacuum, and/or the use of an azeotrope. The amine or acid number can be influenced in a known manner by the proper control of the reaction and the mol ratio of the acid or amino moieties present.

The above polyamides are described in published German patent application No. 31 11 226 and corresponding U.S. patent application No. 06/678,230, both of which are entirely incorporated herein by reference.

Other suitable polyamides are those disclosed in U.S. Pat. No. 4,062,828, which retain their flexibility at temperatures as low as $-20°$ C. preferably $-40°$ C., and which may be identified by simple experimentation. U.S. Pat. No. 4,062,828 is also incorporated herein by reference.

Optical fibers having a single layer of a polyamide according to this invention are generally adequate for use as optical waveguides. However, if desired, a secondary layer of a different polymer may be applied using any known methods, such as lacquering, or melt dipping (under conditions that do not disturb the primary polyamide layer). The secondary layer does not have to meet the flexibility requirements imposed on the primary layer. Accordingly, commonly used polymers such as a nylon-type polyamide, polyethylene, copolymer of vinyl acetate and ethylene/propylene, polyester, thermoplastic elastomer, polyfluoroethylene, or the like, may be used for the secondary layer.

EXAMPLE 1

A thermoplastic polyamide useful in this invention was produced from the following constituents:

(a) 653.1 g of dimerized fatty acids*
(b) 12.6 g of tall oil fatty acid
(b) 59.1 g of sebacic acid
(c) 167.1 g of bis-(3-aminopropyl)-polytetrahydrofuran (M.W. 1,100) and
(d) 81.9 g of ethylene diamine using the following procedure:

The carboxylic acids initially introduced were initially heated under nitrogen to around 60° C. and the other reaction components subsequently added. The reaction mixture was then heated for 1 hour to 230° C. and left at that temperature for 1 hour, followed by evacuation to 15 mbar over the next 60 minutes at a constant temperature. After cooling to 210° C., the reaction product was discharged and its determined characteristics were:

Amine number: 5.2
Acid number: 1.4
Softening point: +168° C.
Glass transition temperature: −45° C.
Torsion modulus: −40° C. $10^9$ N/m$^2$; +50° C. $10^8$ N/m$^2$.

* A mixture derived from $C_{16-18}$ fatty acids containing 70% $C_{18}$ and having 96% dimer, 3% trimer, and 1% monomer, all percentages by weight.

EXAMPLES 2-5

The condensation reaction was performed in a glass flask properly equipped with tubes, initially in a nitrogen atmosphere and with agitation. The transferred carboxylic acids were first heated to approx. 60° C. and the other reaction components were then added. The mixture was heated to 230° C. within 1 hour, and this temperature was maintained for 1 hour. During the next hour, a vacuum of 15 mbar was established at constant temperature. After cooling to 120° C. the reaction product was drained off and isolated for determination of its properties.

The following reaction components were used:
(a) dimerized fatty acid (I) with 72% dimer content,
(a) dimerized fatty acid (II) with 96% dimer content,
(b) tall oil fatty acid,
(c) bis-(3-aminopropyl)-polytetrahydrofuran, MW 750 (polyether diamine A).
(c) bis-(3-aminopropyl)-polytetrahydrofuran, MW 1,100 (polyether diamine B).
(c) bis-(2-aminopropyl)-polyoxypropylene, MW 2,000 (polyether diamine C).
(d) ethylenediamine.
(d) diamine prepared via the nitrile of a 96% dimerized fatty acid and followed by hydrogenation (dimer diamine).

The amounts used as well as the amine and acid number of the reaction product are recorded in the table below, under the consecutive example numbers. Also listed are the softening point (R+B, ASTM E-28) and the flexibility values, found at low temperatures. The latter was determined by wrapping a test piece with the dimensions 20 mm × 170 mm and a thickness of 1 mm by 360 deg around a brass cylinder with a diameter of 25.6 mm. The tests were carried out with decreasing temperatures (test piece and cylinder in temperature equilibrium) to determine the lowest temperature at which three of five test pieces survived the wrapping test without breaking.

TABLE 1

| Component | Content (g) | | | |
|---|---|---|---|---|
| | Ex. 2 | Ex. 3 | Ex. 4 | Ex. 5 |
| Dimeric fatty acid I | 759.2 | — | 795.2 | 795.2 |
| Dimeric fatty acid II | — | 820.8 | — | — |
| Tall oil fatty acid | 59.8 | 34.2 | 59.8 | 59.8 |
| Ethylenediamine | 81.0 | 63.5 | 83.2 | 82.8 |
| Dimer diamine | — | 173.4 | — | — |
| Polyether diamine A | 112.4 | 168.7 | — | — |
| Polyether diamine B | — | — | 123.6 | — |
| Polyether diamine C | — | — | — | 380.0 |

Analytic data for Examples 2-5 is as follows:

TABLE 2

| Example | Amine No. | Acid No. | Softening point (°C.) | Flexibility to (°C.) |
|---|---|---|---|---|
| 2 | 0.7 | 9.8 | +105 | −50 |
| 3 | 5.5 | 1.2 | +96 | −60 |
| 4 | 7.6 | 1.0 | +106 | −50 |

TABLE 2-continued

| Example | Amine No. | Acid No. | Softening point (°C.) | Flexibility to (°C.) |
|---|---|---|---|---|
| 5 | 2.9 | 1.4 | +105 | −60 |

COMPARATIVE EXAMPLES 6 and 7

As described in preceding Examples 2-5, polyamide condensation products were prepared from the following batches:

(Example 6)

802.5 g polymeric fatty acid I
55.5 g tall oil fatty acid
65.1 g ethylenediamine
91.5 g 4,7,10-trioxatridecan-1,13-diamine (Example 7)

810.0 g polymeric fatty acid I
45.0 g tall oil fatty acid
63.0 g ethylenediamine
91.8 g 4,9-dioxadodecan-1,12-diamine Analytic data obtained in the same manner as for Examples 2-5 is shown in the following table.

TABLE 3

| Comparative Example | Amine No. | Acid No. | Softening point (°C.) | Flexibility to (°C.) |
|---|---|---|---|---|
| 6 | 3.2 | 5.2 | +93 | −30 |
| 7 | 4.2 | 1.6 | +92 | −25 |

The polyamides of Comparative Examples 6 and 7 are markedly inferior to those of Examples 1-5 because their flexibility does not extend to temperatures of at least −40° C., as is critical in this invention.

EXAMPLE 8

A melt of the polyamide of Example 1 was used at 205° to 210° C. for coating an optical fiber by melt dipping and cooling in accordance with the teachings of this invention. The optical fiber obtained in this way was covered by a uniform polyamide layer 60μ thick. The optical properties of the optical fiber were not adversely affected, i.e., no optical attenuation was observed.

I claim:

1. A method for manufacturing sheathed high tensile strength optical waveguides having drawn glass fiber optical cores comprising:
   passing said cores through a molten thermoplastic polyamide to form an adhering coating; and
   cooling said coating to form a uniform sheath;
   said polyamide sheath being flexible over a temperature range of −40° C. to +80° C.; and said polyamide containing dimeric fatty acid as one of its monomer components, and having a glass transition temperature below −10° C.

2. The method of claim 1 wherein said polyamide is coated substantially immediately after said cores are drawn.

3. The method of claim 1 wherein said molten polyamide is at a temperature of about 170° to 260° C.

4. The method of claim 3 wherein said cooling is affected by application of a drying gas which is at temperature of about 20° to 30° C.

5. The method of claim 4 wherein said cooling is affected substantially immediately said cores have passed through said molten polyamide.

6. The method of claim 5 wherein said cooling gas is ambient air.

7. The method of claim 1 wherein a secondary layer of a different polymer is applied to said sheathed optical cores.

8. The method of claim 7 wherein said secondary layer comprises: nylon-type polyamide, polyethylene, a copolymer of vinyl acetate and ethylene/propylene, polyester, thermoplastic elastomer, or polyfluoroethylene.

9. The method of claim 1 wherein said polyamide has a glass transition temperature below $-40°$ C.

10. The method of claim 9 wherein said polyamide has a torsion modulus of $10^9 N/m^2$ at $-40°$ C. and of $10^8 N/m^2$ at $+50°$ C.

11. The method of claim 1 wherein said polyamide is the melt condensation product of components:
(a) at least one dimeric fatty acid present in 20 to 60 mol %;
(b) at least one $C_{6-22}$ monomeric fatty acid or $C_{6-22}$ aliphatic dicarboxylic acid present in 0.5 to 20 mol %;
(c) at least one polyether diamine of the formula $$H_2N-R_1-O-(RO)_x-R_2-NH_2,$$

wherein
x is an integer from 2 to 80;
R is a $C_{1-6}$ branched or linear aliphatic hydrocarbon,
$R_1$ and $R_2$ are each a $C_{2-6}$-aliphatic or cycloaliphatic hydrocarbon, which may be the same or different, which polyether diamine is present in 1 to 50 mol %; and
(d) at least one $C_{2-40}$-lower molecular weight diamine present in 15 to 50 mol %.

12. The method of claim 11 wherein: component (a) is a polymeric fatty acid mixture containing at least 70% dimers formed from $C_{12-22}$ fatty acid monomers; component (b) is at least one $C_{12-22}$ monomeric fatty acid or $C_{12-22}$ aliphatic dicarboxylic acid; and component (d) has 2 to 20 carbon atoms.

13. The method of claim 12 wherein: component (a) is present in about 40 to 48 mol %; component (b) is present in about 2 to 10 mol %; component (c) is present in about 4 to 25 mol %; and component (d) is present in about 25 to 46 mol %.

14. The method of claim 11 wherein: component (a) is a polymeric fatty acid mixture containing at least 90% dimers with monomers and trimers comprising the balance to 100%, and formed from $C_{14-20}$ fatty acid monomers; component (b) is stearic acid, oleic acid, palmitic acid, a mixture of at least 50% palmitic acid with the balance to 100% myristic acid, tall oil acids, adipic acid, azelaic acid, sebacic acid, decanedicarboxylic acid, mixtures of any of the foregoing, or mixtures of aliphatic dicarboxylic acids having $C_{6-12}$ or $C_{12-22}$ chain length ranges; component (c) is at least one compound having a molecular weight of about 500 to 5,000 selected from bis-(2-aminopropyl)-polyoxypropylene or bis-(3-aminopropyl)-polytetrahydrofuran; and component (d) is at least one aliphatic diamine selected from ethylenediamine, 1,3-diaminopropane, 1,4-diaminobutane, neopentyldiamine, hexamethylenediamine, or trimethylhexamethylenediamine, at least one dimer diamine obtained from a dimeric fatty acid in which the carboxyl moieties are substituted by amino moieties, at least one cycloaliphatic diamine selected from diaminodicyclohexylmethane, or 3-aminomethyl-3,5,5-trimethylcyclohexylamine, an aromatic diamine which is diaminodiphenylmethane, an arylaliphatic diamine which is xylylenediamine, at least one heterocyclic diamine selected from piperazine, dimethylaminopiperazine, or dipiperidylpropane, or any mixture of the foregoing.

15. The method of claim 14 wherein: component (a) is present in about 40 to 48 mol %; component (b) is present in about 2 to 10 mol %; component (c) is present in about 4 to 25 mol %; and component (d) is present in about 25 to 46 mol %.

16. The method of claim 11 wherein: component (a) is present in about 35 to 49.5 mol %; component (b) is present in about 1 to 15 mol %; component (c) is present in about 2 to 35 mol %; and component (d) is present in about 15 to 48 mol %.

17. The method of claim 11 wherein: component (a) is present in about 40 to 48 mol %; component (b) is present in about 2 to 10 mol %; component (c) is present in about 4 to 25 mol %; and component (d) is present in about 25 to 46 mol %.

* * * * *